(12) United States Patent
Hsu

(10) Patent No.: US 6,926,052 B2
(45) Date of Patent: Aug. 9, 2005

(54) VEHICLE TIRE

(76) Inventor: Shut Chen Hsu, No. 7 Alley 1, Lane 163, Sec. 3, Nung-Chuan Rd., I Lan City (TW)

( * ) Notice: Subject to any disclaimer, the term of this patent is extended or adjusted under 35 U.S.C. 154(b) by 312 days.

(21) Appl. No.: 10/352,091

(22) Filed: Jan. 28, 2003

(65) Prior Publication Data

US 2004/0144463 A1 Jul. 29, 2004

(30) Foreign Application Priority Data

Dec. 19, 2002 (TW) .......................................... 091136699

(51) Int. Cl.⁷ .......................... B60C 17/00; B60C 17/04; B60C 15/028
(52) U.S. Cl. ...................... 152/516; 152/520; 152/158; 152/165; 152/399
(58) Field of Search ................................ 152/152, 155, 152/158, 159, 165, 399, 516, 520

(56) References Cited

U.S. PATENT DOCUMENTS

| 2,028,601 | A | * | 1/1936 | Hall | 152/400 |
| 4,461,333 | A | * | 7/1984 | Filliol et al. | 152/158 |

FOREIGN PATENT DOCUMENTS

| JP | 53-36803 | * | 4/1978 |
| JP | 63-255106 | * | 10/1998 |
| JP | 2002-120527 | * | 4/2002 |
| JP | 2002-240519 | * | 8/2002 |

* cited by examiner

*Primary Examiner*—Blaine Copenheaver
*Assistant Examiner*—Justin Fischer
(74) *Attorney, Agent, or Firm*—Rosenberg, Klein & Lee

(57) ABSTRACT

A vehicle tire is constructed to include a main tire member, the main tire member having two inward lips, and two annular supplementary tire members respectively fastened to the inward lips of the main tire member and adapted to support the main tire member in shape when damaged accidentally.

6 Claims, 7 Drawing Sheets

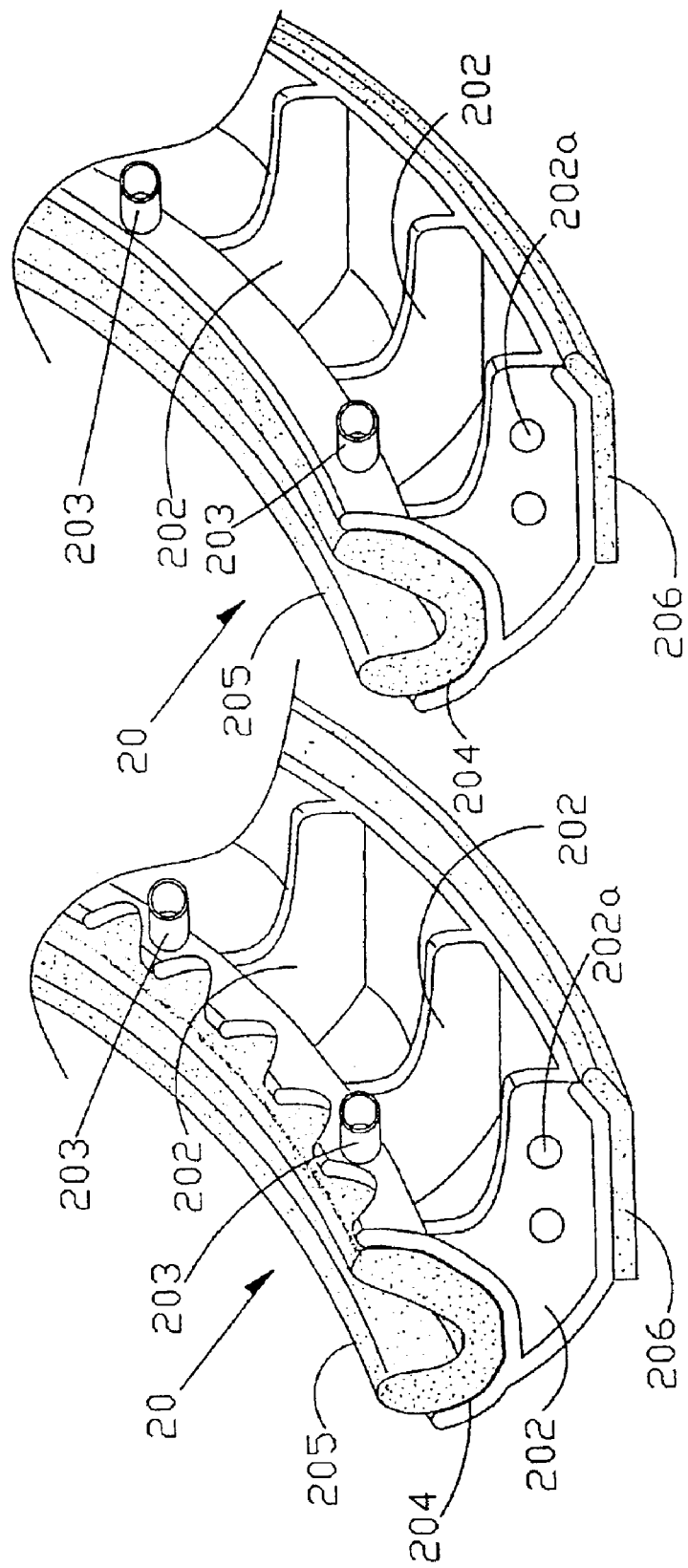

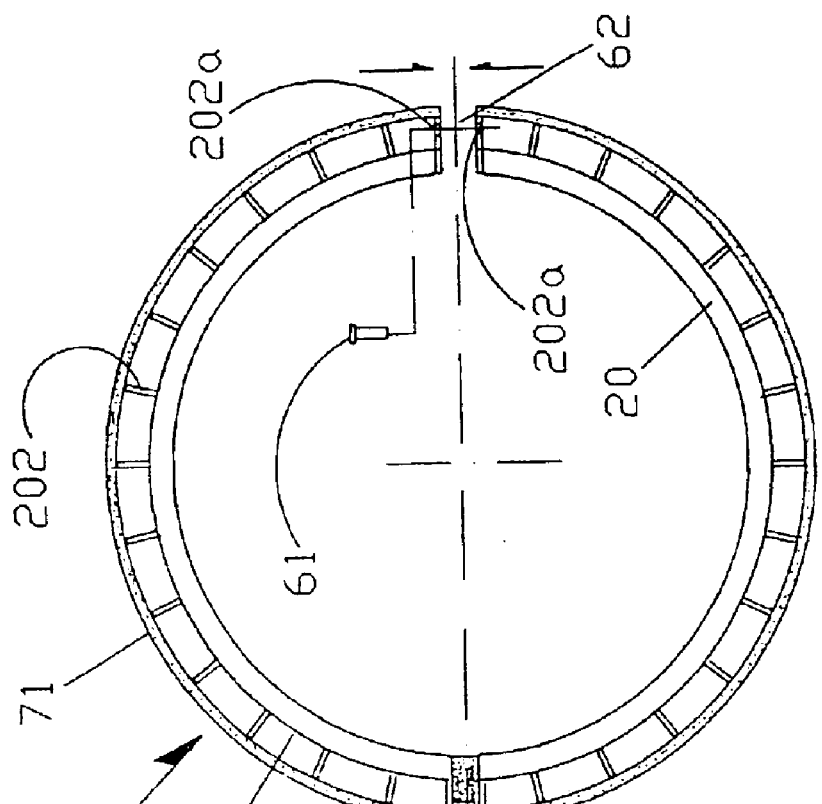
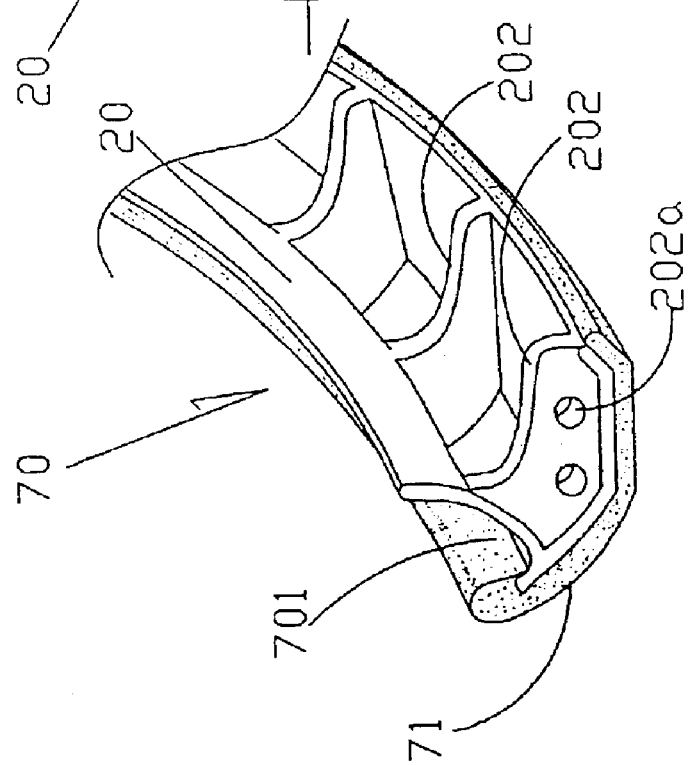
FIG.3C
FIG.3D

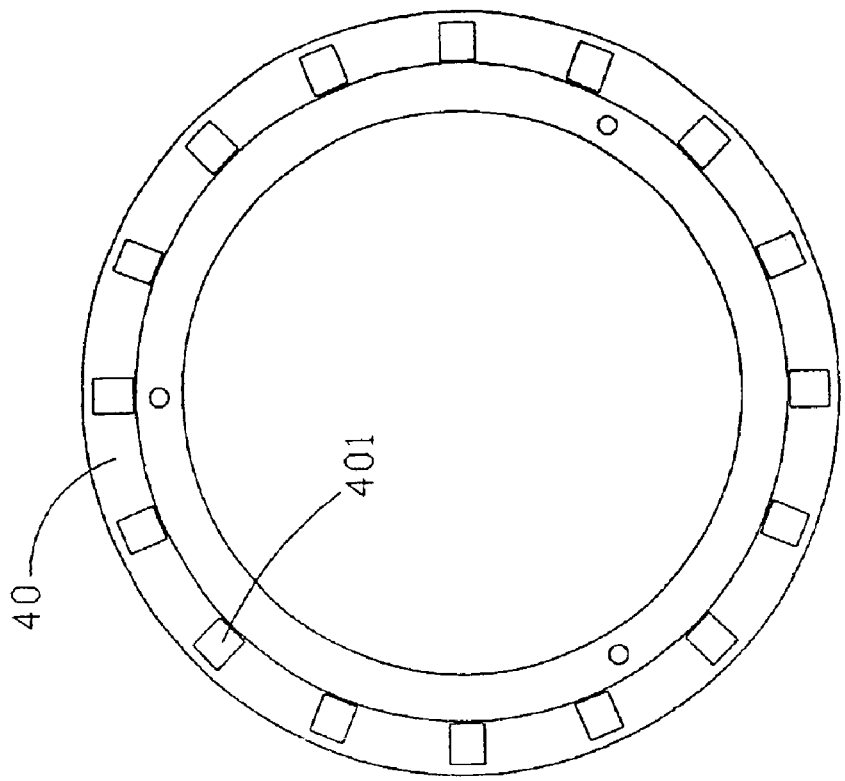
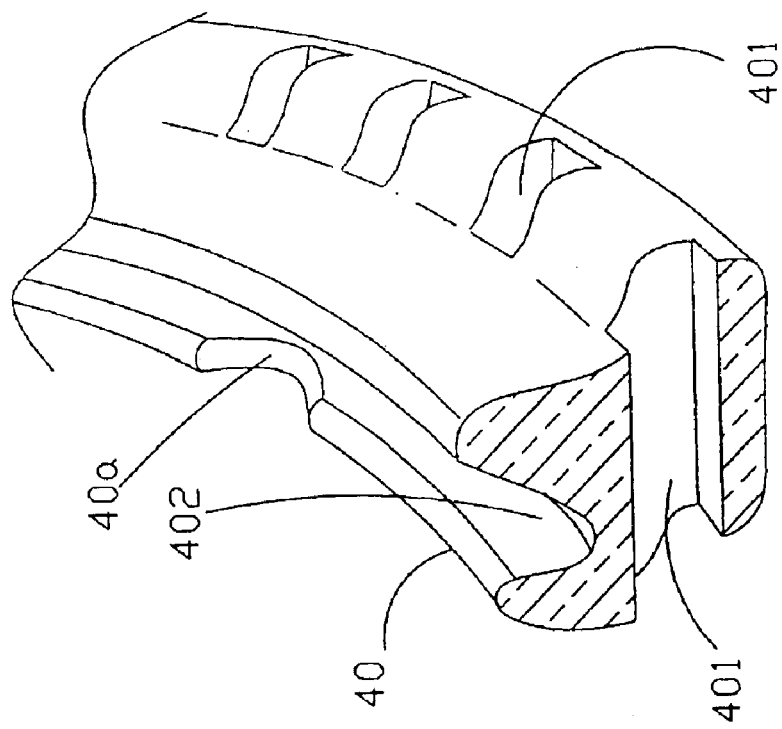
FIG.4B
FIG.4A

VEHICLE TIRE

BACKGROUND OF THE INVENTION

1. Field of the Invention

The present invention relates to vehicle tires and, more particularly, to such a vehicle tire, which supports the tire for normal functioning for a length time when the tire damaged accidentally.

2. Description of the Related Art

For a safety driving, the condition of vehicle tires must be regularly checked. There are two kinds of vehicle tires used in existing motorcars, namely, the tire having an inner tube, and the tire without inner tube. According to conventional tire designs, a meshed metal wire structure formed of transverse metal wires and a longitudinal metal wires is arranged in between the carcass and the tread. The two layers of metal wires are arranged at 17~26°. This meshed metal wire structure can only reinforce the structural strength of the tire. It cannot protect the tire against piercing of an external sharp object. When a nail or the like pierced through the open spaces in the meshed metal wire structure, the tire leaks, and a tire explosion accident may occur.

U.S. application Ser. Nos. 10/022,424, 10/157,149, applied by the present inventor, disclose different tire structures that eliminate the aforesaid problems.

SUMMARY OF THE INVENTION

The present invention has been accomplished under the circumstances in view. According to one aspect of the present invention, the vehicle tire comprises a main tire member, the main tire member having two inward lips, and two annular supplementary tire members respectively fastened to the inward lips of the main tire member and adapted to support the main tire member in shape when damaged accidentally. According to another aspect of the present invention, the supplementary tire members each comprises two semicircular supplementary tire elements, each semicircular supplementary tire element having a plurality of transversely extended reinforcing ribs, a top locating groove, and a plurality of mounting screw holes in the reinforcing ribs near two distal ends thereof, a plurality of screw bolts fastened to the mounting screw holes of the semicircular supplementary tie elements to secure the semicircular supplementary tire elements into an annular supplementary tire member, and a packing member mounted in the top locating groove of the respective supplementary tire element for engagement with one inward lip of the main tire member. According to still another aspect of the present invention, retractable stretchers are stretched between the supplementary tire members to support the supplementary tire members on the inward lips of the main tire.

BRIEF DESCRIPTION OF THE DRAWINGS

FIG. 2A is an elevational view of a part of a supplementary tire element for a supplementary tire member for a vehicle tire according to the present invention.

FIG. 2B shows an alternate form of the supplementary tire element according to the present invention.

FIG. 3C is a schematic plain view of an alternate form of the supplementary tire member according to the present invention.

FIG. 3D is an elevational view, in an enlarged scale, of a part of FIG. 3C.

FIG. 4A is an elevational view of a part of another alternate form of the supplementary tire member according to the present invention.

FIG. 4B is a sectional plain view of the supplementary tire member shown in FIG. 4A.

DETAILED DESCRIPTION OF THE PREFERRED EMBODIMENT

Referring to FIGS. 1, 2A, 2B, 3A, 3B, and 5, a vehicle tire in accordance with the present invention is shown comprised of a main tire member 10, two supplementary tire members 200, packing members 205 and 206, and retractable stretchers 30.

Figure 1:
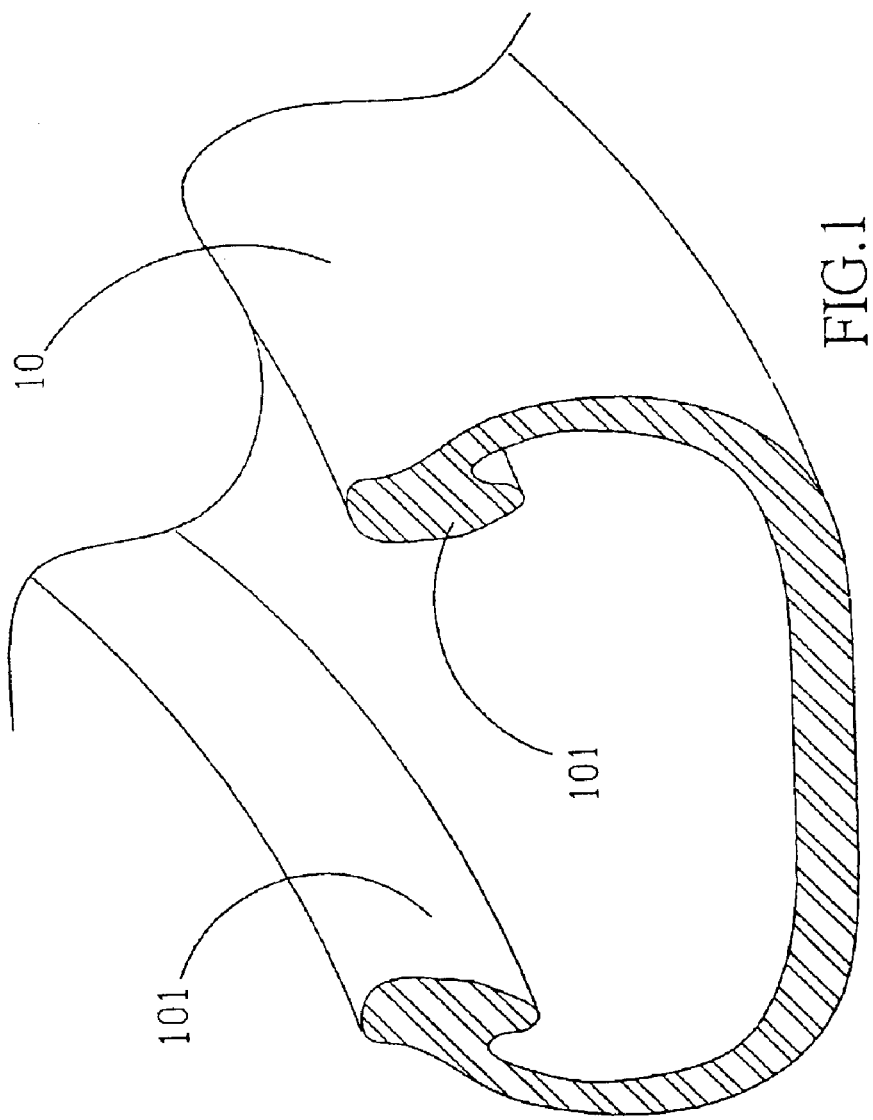
FIG. 1 is an exploded view of a main tire member for a vehicle tire according to the present invention.
Figure 3B:
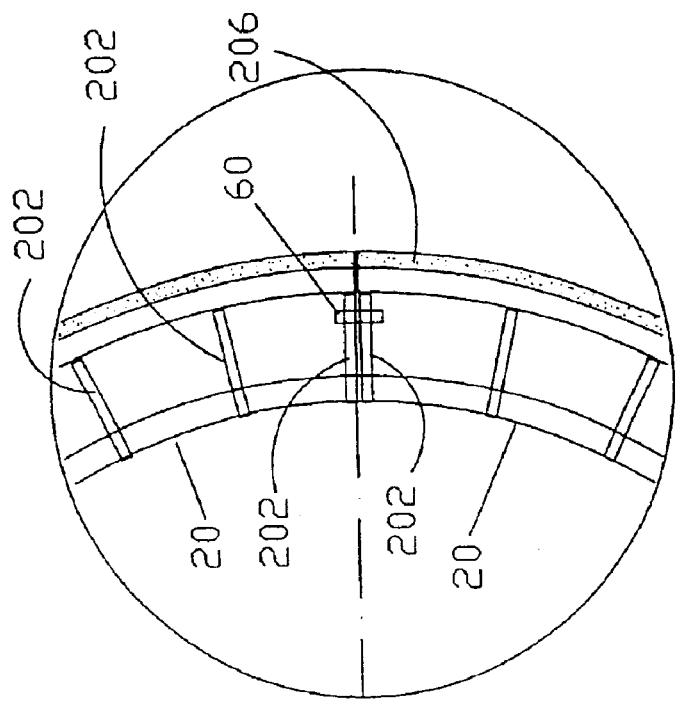
FIG. 3B is an enlarged view of a part of FIG. 3A.
Figure 3A:
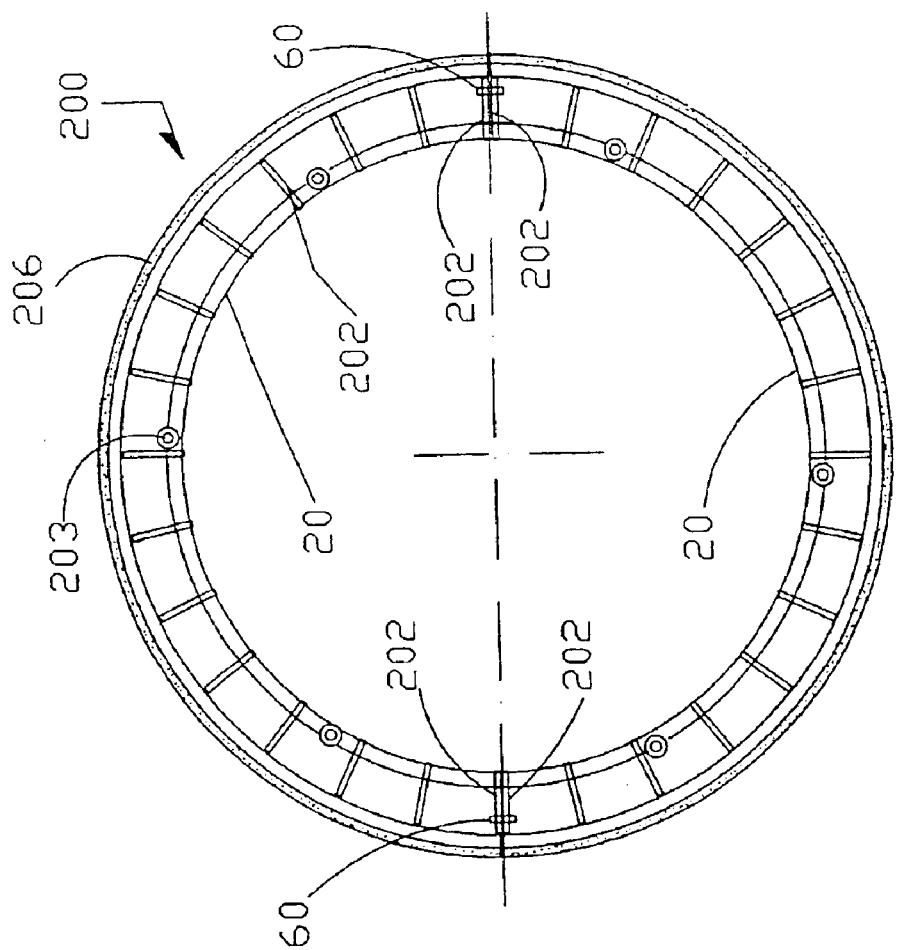
FIG. 3A is a sectional plain view of a supplementary tire member for a vehicle tire according to the present invention.

The main tire member 10 has embedded therein meshed reinforcing members, two inward lips 101 respectively inwardly protruded from the two opposite sidewalls thereof (see FIG. 1). The supplementary tire members 200 each are comprised of two supplementary tire elements 20 (see FIGS. 3A, 3B and 5). The two supplementary tire elements 20 each have transversely extended reinforcing ribs 202, transversely extended plugholes 203, and a longitudinally extended top locating groove 204 (see FIGS. 2A and 2B). The periphery of the locating groove 204 of each supplementary tire element 20 may be smooth (see FIG. 2A), or serrated (see FIG. 2B). The first and last reinforcing ribs 202 of the supplementary tire elements 20 have screw holes 202a. Screw bolts 60 are fastened to the screw holes 202a to fixedly secure the two supplementary tire elements 20 into one circular supplementary tire member 200 (see FIGS. 3A and 3B). Packing members 205 are respectively fastened to the longitudinally extended top locating grooves 204 of the semicircular halves 20 of the supplementary tire members 200. Packing members 206 are respectively fixedly fastened to the supplementary tire elements 20 of the circular supplementary tire members 200 at the bottom side (opposite to the top locating grooves 204). The retractable stretchers 30 are connected between the supplementary tire members 200. Each retractable stretcher, 30 is comprised of two parts that slide one inside another. The two parts of each retractable stretcher 30 are respectively fastened to a respective plughole 203 in the circular supplementary tire members 200. One part of each retractable stretcher 30 has a spring-supported retaining rod 300 and, the other part of each retractable stretcher 30 has a plurality of locating holes 301 and 302 longitudinally aligned in a line and adapted to selectively receive the spring-supported retaining rod 300. A spring member may be mounted in each retractable stretcher 30 and connected between the two parts of the respective retractable stretcher 30 to force the two parts of the respective retractable stretcher 30 apart.

Figure 5:
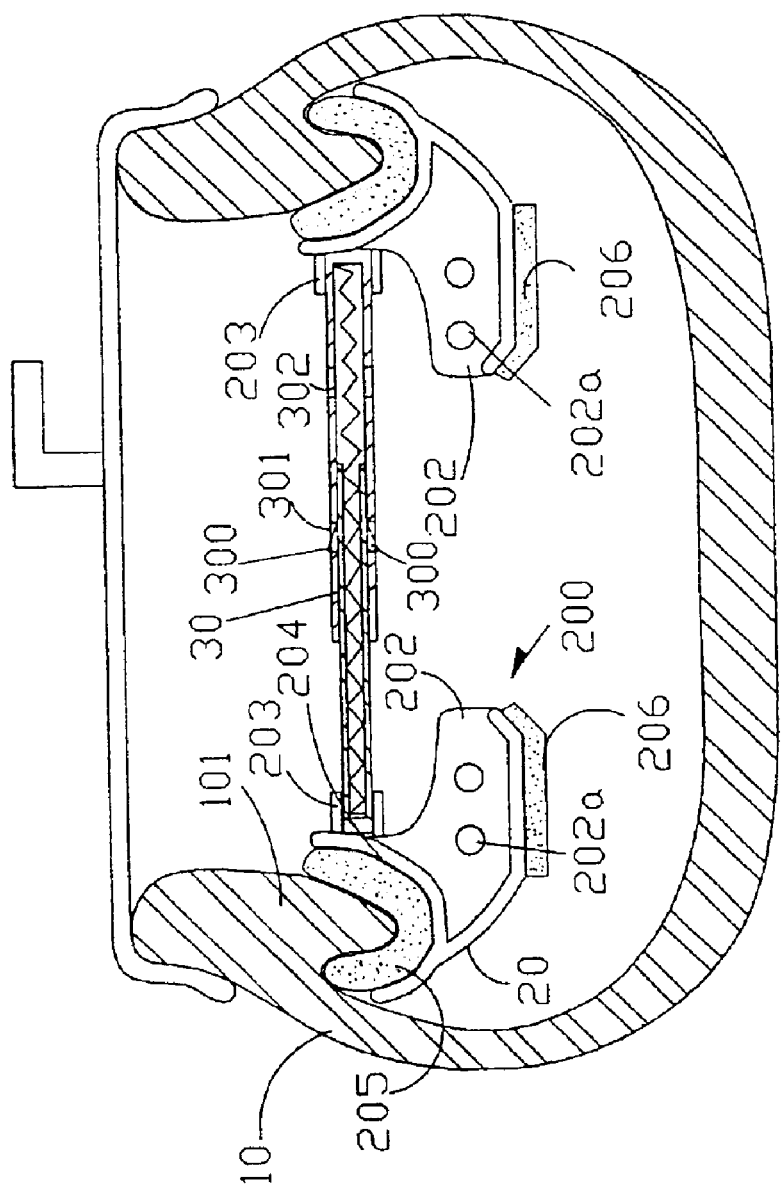
FIG. 5 is a cross-sectional view of a vehicle tire according to the present invention.

With reference to FIG. 5, the two supplementary tire members 200 are respectively fastened to the inward lips 101 of the main tire member 10, and the retractable stretchers 30 are connected between the supplementary tire members 200 to force the supplementary tire members 200 into positive engagement with the inward lips 101 of the main tire member 10. When installed, the packing members 205 are respectively sandwiched in between the inward lips 101 of the main tire member 10 and the supplementary tire elements 20 of the supplementary tire members 200.

FIGS. 3C and 3D show an alternate form of the supplementary tire member. According to this embodiment, the supplementary tire member 70 is shaped like a split ring, comprising a supplementary tire element 20 and an outer rubber layer 71 covering the supplementary tire element 20. The outer rubber layer 71 has a longitudinally extended top locating groove 701 for engagement with one inward lip 101 of the main tire member 10 (see FIG. 1). The supplementary tire element 20 has transversely extended reinforcing ribs 202 and screw holes 202a in the reinforcing ribs 202 at the two distal ends. Screw bolts 61 are respectively fastened to the screw holes 202a to join the ends of the supplementary tire element 20. The supplementary tire element 20 is preferably made of metal alloy or strong light metal.

FIGS. 4A and 4B show another alternate form of the supplementary tire member. According to this embodiment, the supplementary tire member 40 is an annular member molded from rubber having meshed reinforcing means embedded therein. The supplementary tire member 40 has a plurality of transversely extended air vents 401, an endless locating groove 402 extended along the inner diameter for coupling to one inward lip 101 of the main tire member 10 (see FIG. 1), and a hand notch 40a at one side of the endless locating groove 402 for easy installation of the supplementary tire member 40 in one inward lip 101 of the main tire member 10.

Figure 6:
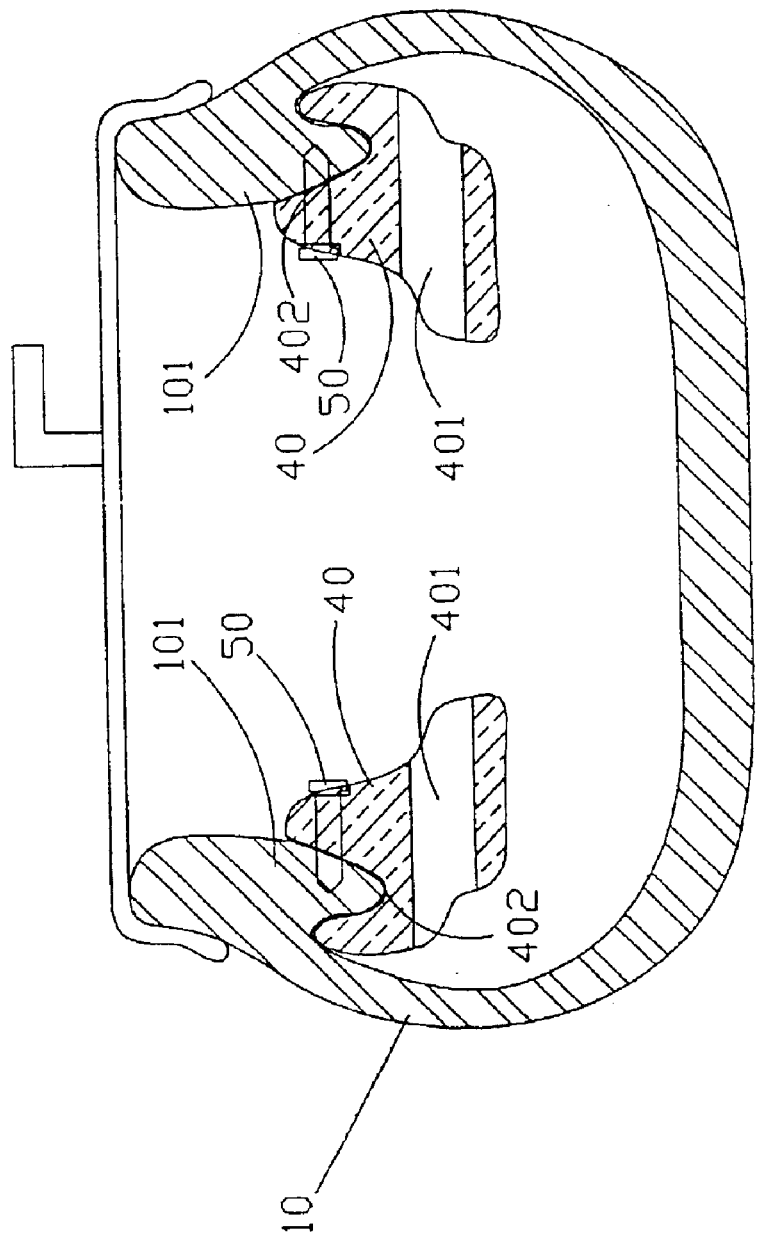
FIG. 6 is a cross-sectional view of an alternate form of the vehicle tire according to the present invention.

With reference to FIG. 6 and FIGS. 4A and 4B again, the supplementary tire members 40 are respectively and bilaterally fastened to the inside of the main tire member 10 and fixedly secured thereto with screws 50, keeping the endless locating grooves 402 of the supplementary tire members 40 engaged with the inward lips 101 of the main tire member 10.

In case the tire 10 exploded due to an accident, the supplementary tire members 200 or 40 support the tire 10 in shape, enabling the car to be continuously driven to a repair shop safely to receive a repair.

It is to be understood that the drawings are designed for purposes of illustration only, and are not intended for use as a definition of the limits and scope of the invention disclosed.

What the invention claimed is:

1. A vehicle tire comprising:
   a main tire member, said main tire member having embedded therein meshed reinforcing members and two inward lips respectively inwardly protruded from two opposite sidewalls thereof; and
   two annular supplementary tire members respectively fastened to the inward lips of said main tire member and adapted to support said main tire member in shape when damaged accidentally, said supplementary tire members each comprising two semicircular supplementary tire elements, said semicircular supplementary tire elements each having a plurality of transversely extended reinforcing ribs, a top locating groove, and a plurality of mounting screw holes in said reinforcing ribs near two distal ends thereof, a plurality of screw bolts fastened to the mounting screw holes of said semicircular supplementary tire elements to secure said semicircular supplementary tire elements into an annular supplementary tire member, and a packing member mounted in the top locating groove of the respective supplementary tire element for engagement with one inward lip of said main tire member.

2. The vehicle tire as claimed in claim 1, wherein said supplementary tire members each further comprise a plurality of supplementary packing members respectively fastened to the respective supplementary tire elements at a bottom side.

3. The vehicle tire as claimed in claim 1, wherein the periphery of the locating groove of each supplementary tire element of each of said supplementary tire members is serrated.

4. The vehicle tire as claimed in claim 1 further comprising a plurality of retractable stretchers respectively supported between said supplementary tire members, said retractable stretchers each comprising a first part and a second part that slide one inside the other, said first part and said second part each having one end plugged into one plughole in one supplementary tire element of one of said supplementary tire members, and spring means mounted inside said first part and said second part and adapted to force said first part and said second part apart, said first part having a spring-supported retaining rod, said second part having a plurality of locating holes longitudinally aligned in a line and adapted to receive said spring-supported retaining rod.

5. A vehicle tire comprising:
   a main tire member, said main tire member having embedded therein meshed reinforcing members and two inward lips respectively inwardly protruded from two opposite sidewalls thereof; and
   two annular supplementary tire members respectively fastened to the inward lips of said main tire member and adapted to support said main tire member in shape when damaged accidentally, said supplementary tire members each comprising a supplementary tire element shaped like a split ring, said supplementary tire element having a plurality of transversely extended reinforcing ribs and a plurality of mounting screw holes in said reinforcing ribs near two distal ends thereof, a plurality of screw bolts fastened to the mounting screw holes of said semicircular supplementary tire elements to join the two distal ends of said supplementary tire element, and a rubber cover layer fastened to an outside wall of said supplementary tire element, said rubber cover layer having a locating groove forced into engagement with one inward lip of said main tire member.

6. A vehicle tire comprising:
   a main tire member, said main tire member having embedded therein meshed reinforcing members and two inward lips respectively inwardly protruded from two opposite sidewalls thereof; and
   two annular supplementary tire members respectively fastened to the inward lips of said main tire member and adapted to support said main tire member in shape when damaged accidentally, said annular supplementary tire members being molded from rubber having meshed reinforcing means embedded therein, each having a plurality of transversely extended air vents, an endless locating groove extended along the inner diameter thereof for coupling to one inward lip of said main tire member, and a hand notch at one side of said endless locating groove for easy installation of the respective supplementary tire member in one inward lip of said main tire member.

* * * * *